United States Patent
Wilde et al.

[11] 3,836,225
[45] Sept. 17, 1974

[54] FIBER OPTIC SCANNERS

[75] Inventors: Hans J. Wilde, Niantic; Verne R. Viele, North Stonington, both of Conn.

[73] Assignee: The United States of America as represented by the Secretary of the Navy, Washington, D.C.

[22] Filed: Sept. 24, 1973

[21] Appl. No.: 399,875

[52] U.S. Cl. .................... 350/6, 178/7.6, 350/96 B, 350/285
[51] Int. Cl. ............................................. G02b 17/00
[58] Field of Search............ 178/7.6; 350/96 B, 6, 7, 350/285; 73/70.2

[56] References Cited
UNITED STATES PATENTS

| | | | |
|---|---|---|---|
| 3,210,468 | 10/1965 | Trott | 350/96 B |
| 3,437,393 | 4/1969 | Baker et al. | 350/6 |
| 3,470,320 | 9/1969 | Pike | 350/6 |
| 3,591,255 | 7/1971 | Ploss | 350/96 B |

Primary Examiner—Ronald L. Wibert
Assistant Examiner—Michael J. Tokar
Attorney, Agent, or Firm—Richard S. Sciascia; Arthur A. McGill; Prithvi C. Lall

[57] ABSTRACT

A rod bundle of fiber optic elements transmitting a laser beam are secured at a first location on the rod bundle and driven at a second location on the rod bundle to form a linear scan of the beam. The beam is then collimated and applied to a narrow rectangular bundle of fiber optic elements that are driven orthogonally to the linear scan of the beam to form a scan over a plane surface. The narrow rectangular bundle of fiber optic elements are driven at a lower frequency than the rod bundle of fiber optic elements. All fiber optic elements are driven by electromagnetic or piezoelectric components.

7 Claims, 3 Drawing Figures

FIBER OPTIC SCANNERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to tracking and more particularly to a laser beam scanning system adaptable for use in air and underwater tracking systems.

Present day underwater tracking systems utilize statistical processing in sonar systems. A problem with such systems is that statistical computer techniques can remove just so much of the noise that plague signals reaching an acoustic receiver of sonar systems.

Present laser systems that deflect laser light in air are not readily adaptable for use underwater. These scanners are not rugged, stable, lightweight or small enough for application underwater where a salty environment and continual fluctuations in motion, pressure, humidity and temperature exist.

In addition, for use in air the present invention has all the above advantages over presently used systems.

SUMMARY OF THE INVENTION

Accordingly it is a general purpose and object of the present invention to provide an improved laser beam scanner. It is a further object to provide the scanner with fiber optic components for transmitting the laser beam to a target area. Further objects are that the system is rugged, stable, lightweight and suitable for underwater environment and non-sensitive to continual fluctuations in motion, temperature, humidity and pressure.

This is accomplished according to the present invention by providing orthogonal scanners in which a rod bundle of fiber optic elements are scanned in a linear (one-dimensional) direction to apply a beam to a narrow rectangular bundle of fiber optic elements that are in turn scanned orthogonally to the scan of the rod bundle of elements. The scan of the rod bundle of elements can be in the order of 500 times as rapid as the scan of the narrow rectangular bundle. In neither of the rod bundle nor rectangular bundle scans is there a fly back time in which the fiber optic components are not conducting, as in television where the electron beam is blanked during fly back. The driving elements can be either electromagnetic or piezoelectric and are rigidly attached to the fiber optic components.

DESCRIPTION OF THE PREFERRED EMBODIMENTS

Figure 1:
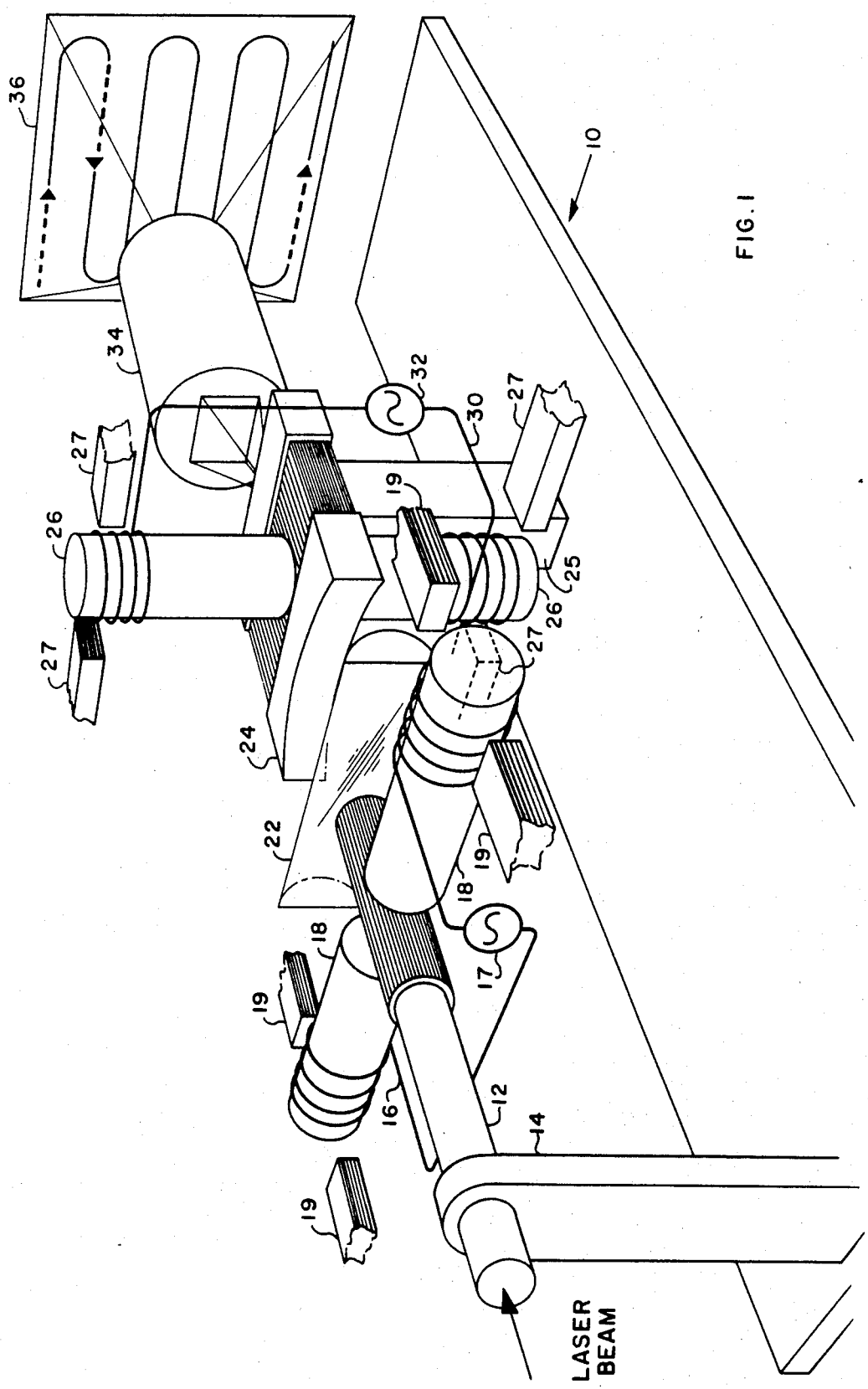
FIG. 1 shows a perspective view of a first embodiment of the present invention utilizing electromagnetic driving means.

Referring now to FIG. 1 there is shown a fiber optical scanning means 10 suitable for use underwater or in air. A coherent fiber optic rod bundle 12 is adapted to receive a laser beam. The fiber bundle 12 is fixedly secured by means of a mounting 14 at the end of the bundle 12 that receives the laser beam. Electric coils 16 are wrapped around iron or ALNICO ends of a stiff aluminum or plastic rod 18 that is rigidly affixed to fiber bundle 12. The coils 16 on rod 18 are wrapped in the opposite directions on respective sides of bundle 12. Permanent magnets 19 complete the magnetic deflection circuit. An a-c source 17 is supplied to coils 16 in order to deflect bundle 12 back and forth in a horizontal direction at the frequency of the a-c source. This causes a received laser beam to alternately scan from left to right and right to left forming a narrow sector of light that passes through half a cylindrical lens 22.

The lens 22 further narrows the beam and insures that the sector of light is horizontal on being applied to a coherent narrow rectangular fiber bundle 24. A mounting 25 is rigidly connected to bundle 24 at the end receiving the beam. A stiff aluminum or plastic rod 26 having iron or ALNICO ends is affixed to bundle 24. The rod 26 has a coil 30 wound around the magnetic ends like those of rod 16. The coil is wound in opposite directions on respective sides of bundle 24. This deflects bundle 24 alternately up and down, at the end opposite to mounting 25 when coil 30 is energized by a-c source 32. This deflection is at the frequency of the a-c source 32. A beamformer 34 receives the beam from bundle 24 and a display 36 is provided that shows the scan of the beam. Display 36 only shows a 10 to 1 ratio in the number of horizontal cycles by bundle 12 compared to the vertical cycles by bundle 24. In reality the ratio is normally in the hundreds to one magnitude.

Figure 2:
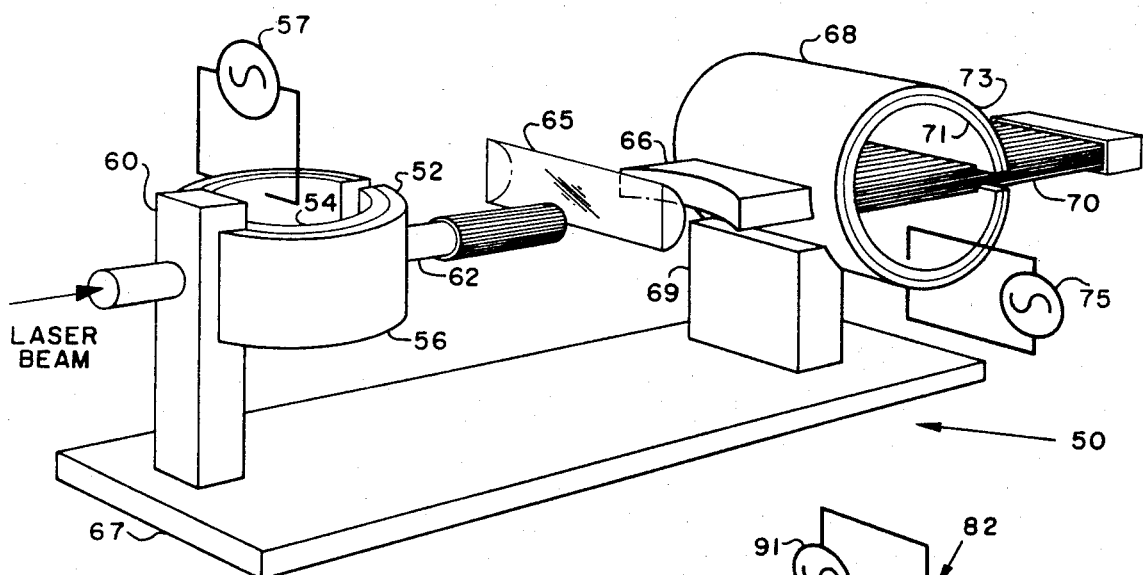
FIG. 2 shows a perspective view of a second embodiment of the present invention utilizing split cylindrical type piezoelectric drivers.

Referring now to FIG. 2 there is shown a piezoelectric scanner 50. A split cyclindrical bender piezoelectric transducer 56 is formed of elements 52 and 54. The transducer may be type PZT-4 or PZT-5. Upon applying a voltage across piezoelectric 56 by means of source 57 the material deforms in the horizontal direction. The piezoelectric 56 is rigidly affixed to a mounting clamp 60. A coherent fiber bundle rod 62, similar to bundle 12 of FIG. 1, passes through a hole and is affixed to the rear of piezoelectric 56. The bundle 62 then passes through a slot 64 in the forward, open end section of piezoelectric 56. The bundle 62 and slot 64 are of such sizes that the bundle 62 touches the sidewalk of slot 64. This causes the bundle 62 to scan horizontally upon the piezoelectric transducer 56 being deformed from an electrical signal being applied to piezoelectric 56. Therefore, a laser beam applied to the clamped end of bundle 62 near mounting means 60 forms a horizontal linear scan at the opposite end of bundle 62, upon piezoelectric 56 having an alternating voltage from supply 57 applied across it. The frequency of the scan is that of the applied signal. The horizontally scanning beam is passed through a half cylindrical lens 65 similar to lens 22 of FIG. 1. This insures that the beam is horizontal as applied to a coherent narrow rectangular fiber optic bundle 66. Bundle 66 passes through piezoelectric transducer 68 near a mounting clamp 69. The mounting clamp 69 affixes transducer 68 to a platform 67. The piezoelectric transducer 68 is of the prestressed bender type having elements 71 and 73 and a slot 70 for passing fiber bundle 66. The bundle 66 touches the sides of the slot 70. Transducer 68 is longer in the axial direction than transducer 56. This is due to the comparative shapes of bundles 62 and 66. Transducer 68 on receipt of an alternating voltage across it, from supply 75, vibrates in a vertical direction at the frequency of the applied voltage giving an up and down scan to a beam passing through bundle 66. This scan is at a lower frequency than that of bundle 62. The beam then may be applied to a beamformer (not shown) and has a scan similar to that of the system of FIG. 1.

Figure 3:
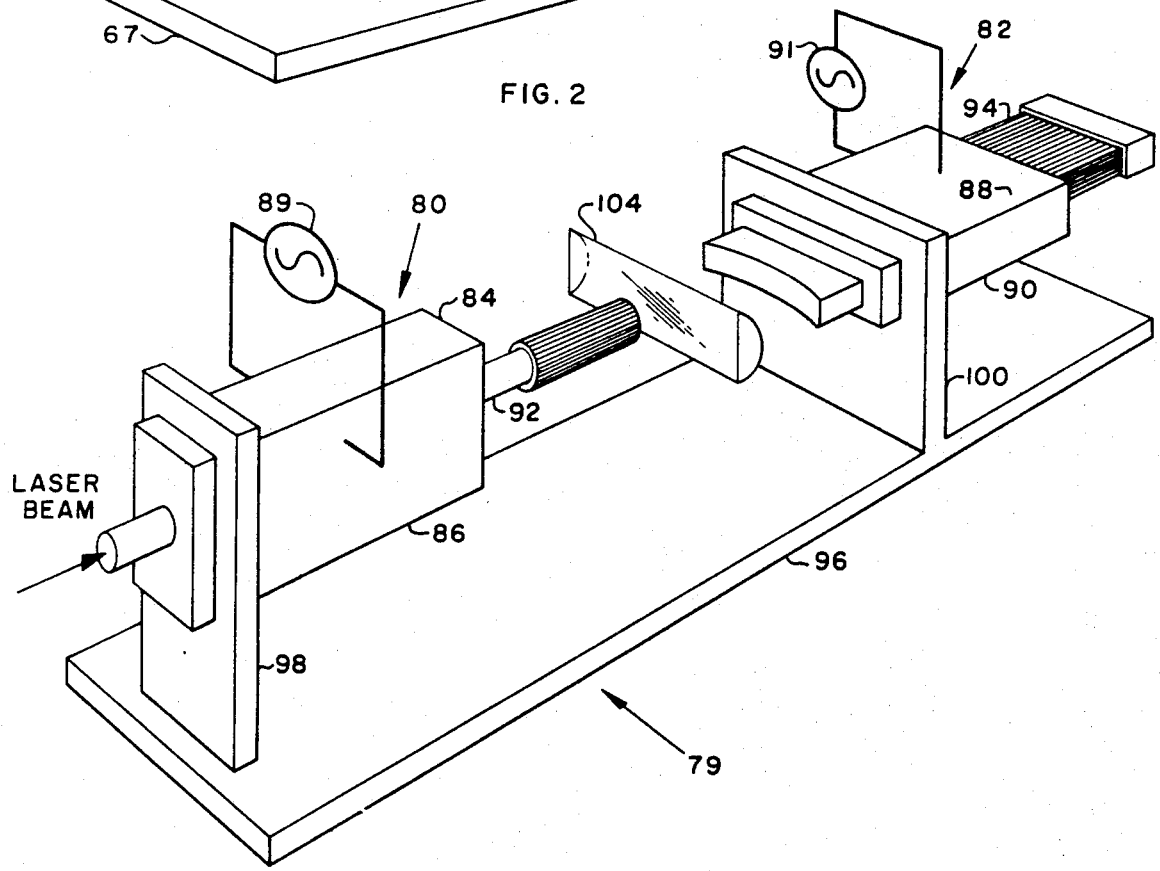
FIG. 3 shows a perspective view of a third embodiment of the present invention utilizing Bimorph transducers as drivers.

Horizontal and vertical deflection of a scanner 79 in FIG. 3 is obtained by applying excitation to two sandwich-like, rectangular bender type transducers 80 and 82, respectively, called Bimorph transducers. Each of the transducers 80 and 82 comprise two rectangular plates 84, 86 and 88, 90, respectively, of PZT-4, 5 or 6 material. The horizontal deflecting rectangular plates 84 and 86 are oppositely charged and bonded together with a very thin conductive medium. The vertical deflecting rectangular plates 88 and 90 differ from horizontal deflecting plates 84 and 86 in that plates 88 and 90 are wider. When voltage from supplies 89 and 91 is applied to respective transducers 80 and 82, one of the two oppositely charged plates 84 or 86 in one case and 88 or 90 in the other contracts while the other plate expands, effectively bending or deflecting the transducer 80 or 82. The deflection is at the frequency of the applied voltage.

A coherent fiber rod bundle 92 is inserted into the center along the longitudinal axis of the Bimorph transducer 80, and a narrow rectangular coherent fiber bundle 94 is likewise built into the center of the larger Bimorph transducer 82 along the longitudinal axis. At the end opposite to the scanning end each of the Bimorph transducers 80 and 82 is rigidly braced to a common housing or platform 96 by respective mounting clamps 98 and 100. Since the fiber bundles 92 and 94 are inserted into the Bimorph transducers 80 and 82, respectively, the bundles 92 and 94 are effectively clamped at their non-deflecting ends along with transducers 80 and 82. A half cylindrical lens 104 is located intermediate to fiber bundle 92 and fiber bundle guide 94 for insuring rays from bundle 92 enter bundle guide 94 in a horizontal plane.

In operation the Bimorph transducer 80, on excitation by a sinusoidal voltage, deflects horizontally about its longitudinal axis by pivoting about its clamped end. The end of fiber bundle 92 that protrudes beyond the moving end of Bimorph transducer 80 is deflected by the oscillating end of transducer 80. Therefore, laser light entering the fixed end of fiber bundle 92 is horizontally deflected when leaving the other end of bundle 92.

The horizontally scanning light then passes through the cylindrical lens 104 before entering the clamped end of the thin rectangular fiber bundle 94. Sinusoidal excitation applied to the Bimorph transducer 82 deflects transducer 82 at the end opposite mounting clamp 100. This in turn deflects rectangular fiber guide 94 in a vertical direction at the end of guide 94 opposite to that receiving the laser light. The light then may be applied to a beamformer (not shown) and has a scan similar to that of the system of FIG. 1.

The scanner of FIG. 3 can be mounted very close to where the light-beam is emitted from the laser. It is even possible to mount the Bimorph scanner directly to the laser housing so that transmission loss and problems of optical alignment can be minimized.

It is significant to note that the Bimorph Fiber Optic Scanner in FIG. 3 has the capability to generate a scan with variable aperture by merely controlling the voltage and frequency of the signal applied to transducers 80 and 82 without requiring complicated optical controls.

For optimum performance in the above three embodiments, the dimensions of the fiber rod bundles for the horizontal scan are determined so that the maximum resonant frequencies of the transducer driving the rod bundle, and the rod bundle are the same. There is normally no such requirement in the vertical scan as this scan is usually low enough so as not to require resonance in the vibration mode of the narrow fiber bundle.

For best operation the frequency of the electrical signal applied to a transducer driving a rod bundle should be chosen to place the rod bundle in its natural resonance of vibration. The electrical signal applied to a transducer driving a rectangular fiber bundle is chosen to produce a uniform display of the horizontal scan in the vertical direction.

Variations of the above embodiments can be obtained due to the fact that deflecting round rod bundles 12, 62 and 92 are interchangeable with each other as are transducers deflecting bundles 24, 66 and 94. The choice of transducers depends upon the application of the scanner and such factors as the presence of stray magnetic fields in the area. The scanners using the piezoelectric transducers are particularly useful in such an environment as neither are affected by the fields.

There has been described means for scanning with a laser beam by the deflection of fiber optic bundles mounted to a variety of transducer elements. A fiber optic bundle forms a horizontal scan of laser light from a plurality of fiber optic elements carrying the laser light and deflecting as a bundle horizontally. A display of light is created by a slow deflection of the horizontal scan vertically. Obviously the first scan could be made vertically and the other horizontally.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:
1. A scanner comprising:
  a fiber optic rod bundle adapted to transmit a beam of light;
  first driving means connected to said fiber optic rod bundle for providing a linear scan of said fiber optic rod bundle in a first direction at a first frequency to enable said rod bundle to transmit a linear scan of the beam of light;
  a narrow rectangular fiber optic bundle aligned to receive the linear scan of the beam of light from said fiber optic rod bundle;
  second driving means connected to said narrow rectangular fiber optic bundle for providing a linear scan to said narrow rectangular fiber optic bundle in a second direction orthogonal to said first direction and at a second frequency, said second frequency being lower than said first frequency.

2. A scanner according to claim 1 further comprising:

said first driving means includes a first electromagnetic system having a first rod connected to said fiber optic rod bundle with a first coil surrounding said first rod; and said second driving means includes a second electromagnetic system having a second electromagnetic rod connected to said narrow rectangular fiber optic bundle with a second coil surrounding said second rod.

3. A scanner according to claim 2 further comprising:

a cylindrical lens positioned intermediate said fiber optic rod bundle and said narrow rectangular fiber optic bundle.

4. A scanner according to claim 1 further comprising:

said first driving means includes a first split cylindrical bender transducer element with said fiber optic rod bundle passing through the split in said first split cylindrical bender transducer element and said fiber optic rod bundle clamped to said first split cylindrical bender transducer element at a location diametrically opposite the split in said first split cylindrical bender transducer element; and said second driving means includes a second split cylindrical bender transducer element with said narrow rectangular fiber optic bundle passing through the split in said second split cylindrical bender transducer element and said narrow rectangular fiber optic bundle clamped to said second split cylindrical bender transducer element at a location diametrically opposite the split in said second split cylindrical bender transducer element.

5. A scanner according to claim 4 further comprising:

a cylindrical lens positioned intermediate said fiber optic rod bundle and said narrow rectangular fiber optic bundle.

6. A scanner according to claim 1 further comprising:

said first driving means includes a first Bimorph transducer having said fiber optic rod bundle passing through the center and along the longitudinal axis of said first Bimorph transducer; and said second driving means includes a second Bimorph transducer having said narrow rectangular fiber optic bundle passing through the center and along the longitudinal axis of said second Bimorph transducer.

7. A scanner according to claim 6 further comprising:

a cylindrical lens positioned intermediate said round fiber optic bundle and said narrow rectangular fiber optic bundle.

* * * * *